United States Patent [19]

Hasegawa et al.

[11] Patent Number: 5,317,136
[45] Date of Patent: May 31, 1994

[54] INFORMATION READING DEVICE WHICH CONTROLS COMMUNICATION INTERRUPT SIGNAL FROM A HOST SYSTEM

[75] Inventors: Makoto Hasegawa, Ichinomiya; Koji Mori, Oobu, both of Japan

[73] Assignee: Nippodenso Co., Ltd., Kariya, Japan

[21] Appl. No.: 809,909

[22] Filed: Dec. 20, 1991

[30] Foreign Application Priority Data

Dec. 20, 1990 [JP] Japan .................................. 2-404307
Sep. 20, 1991 [JP] Japan .................................. 3-241592

[51] Int. Cl.$^5$ .............................................. G06K 7/10
[52] U.S. Cl. ..................................... 235/375; 235/462
[58] Field of Search ............................... 235/375, 462

[56] References Cited

U.S. PATENT DOCUMENTS

| | | | |
|---|---|---|---|
| 4,528,444 | 7/1985 | Hara et al. | 235/472 |
| 4,894,522 | 1/1990 | Elliott | 235/462 |

FOREIGN PATENT DOCUMENTS 59-060570 4/1984 Japan .
62-256095 11/1987 Japan .
63-098081 4/1988 Japan .

*Primary Examiner*—John Sheppard
*Attorney, Agent, or Firm*—Cushman, Darby & Cushman

[57] ABSTRACT

An information reading device for use in a system in which a plurality of slave devices, including the information reading device, are connected to a master unit through a common signal line. The information reading device controls an interrupt signal from the master unit and is provided with an irradiation portion for irradiating electromagnetic waves on a recording medium (i.e., bar code), a signal converting portion (i.e., CCD line sensor) for obtaining information signals representing the bar codes and storing the information signal, a driving portion, a code information output portion for forming code information, converting the code information and outputting a signal representing a result of the conversion of the code information to the master unit, a judgement portion for determining whether or not an interrupt signal is input from the master unit to the information reading device, an interrupt processing portion for performing an interrupt processing in response to an interrupt signal, a driving signal control potion for making the driving portion stop outputting the driving signal, and for making the driving portion resume outputting the driving signal and a code control portion for making the code information outputting portion convert the code information by removing data represented by the signal output from the signal converting portion when the interrupt processing portion performs the interrupt processing.

5 Claims, 11 Drawing Sheets

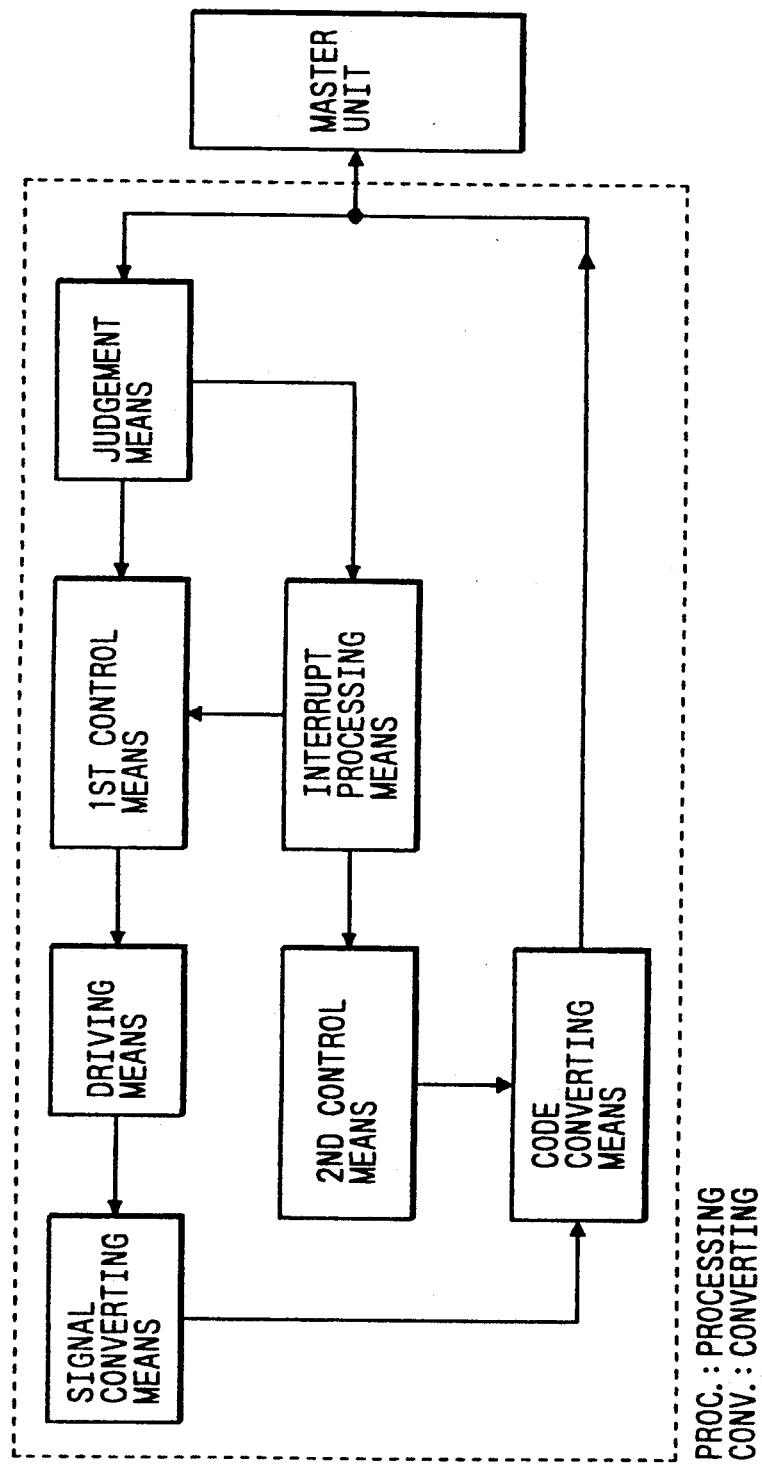

INFORMATION READING DEVICE WHICH CONTROLS COMMUNICATION INTERRUPT SIGNAL FROM A HOST SYSTEM

BACKGROUND OF THE INVENTION

1. Field of The Invention

This invention relates to an information reading device for use in, for example, a point-of-sales (POS) system in which slave devices such as a bar code reader and a keyboard are connected to a master unit such as a host system with a common signal line.

2. Description of The Related Art

As illustrated in FIG. 1, a conventional POS system has a configuration in which a large number of slave devices such as a bar code reader 1, a display 13 and a keyboard 12 are connected to a single master unit (namely, a host system 12) with common signal line (namely, a cable 11). Thus the slave devices communicate with the host system 12 through the cable 11. Further, communication interrupts from the host system 12 to each slave device are frequently caused by control commands output from the host system 12. For instance, in case where an operator sends a operation changing command from the keyboard 1 to the host system 12 in order to change an operation of a slave device, the host system 12 causes a communication interrupt by issuing a control command to the slave device in such a manner to change the operation of the slave device as intended by the operator.

Such a communication interrupt is caused by an interrupt signal output from the host system 12. Further, such communication interrupts to the slave devices, for example, the bar code reader 1, the display 13 and the keyboard 14 (incidentally, note that a practical POS system has a great number of slave devices) occur in the following cases. Namely, an interrupt from the host system 12 to the bar code reader 1 occurs when image data representing a bar code read by the reader 1 is sent therefrom to the host system 12. Further, an interrupt from the host system 12 to the keyboard 14 takes place when data input from such a data input device (namely, the keyboard 14) is sent to the host system 12.

When a communication interruption from the host system 12 to the bar code reader 1 of the POS system having such a configuration occurs, a central processing unit (hereunder referred to as a CPU) of the bar code reader 1 once receives an interrupt signal, which represents a control command corresponding to the communication interrupt, and determines whether or not the control command is directed to the bar code reader 1. If so, the bar code reader performs an interrupt processing according to the control command sent from the host system 1. Namely, when the host system 12 issues the interrupt signal to the bar code reader 1, the bar code reader should receive the interrupt signal once and perform the interrupt processing which includes the processing of determinating whether or not the control command represented by the interrupt signal is directed to the bar code reader 1. Thus the CPU of the bar code reader 1 cannot process image data during the communication interrupt. Consequently, the image data, which are originally continuous, are received by the bar code reader as discontinuous data, and as a whole the received image data become inaccurate.

Thus, when a communication interrupt occurs when the bar code reader 1 receives or reads image data, the conventional system does not treat the received image data as data and removes the received image data therefrom. Otherwise, the conventional system inhibits a communication interrupt thereto when image data are input thereto.

The conventional system of the former type has drawbacks in that the system removes image data even in case where the reading of the image data is almost completed, and thus should read the image data again later and that consequently, what is called a read completion rate is low.

Namely, in the conventional system of the former type, the slave device connected to the common signal line once receives an interrupt signal from the host system 12 and determines whether or not the received interrupt signal represents a control command directed to the slave device as above described. Practically, interrupts to the bar code reader 1 or the keyboard 14 take place very frequently. For example, in case where the number of the slave devices is two, interrupts occur almost 1000 times per second (namely, 500 (times/second)×2 (slave devices)=1000 (times/second)). Thus, if the system once fails in reading image data, a very long time shall have passed by the time at which the next reading of the image data is completed.

Moreover, the conventional system of the latter type has drawbacks in that a communication interrupt indicated by a control command is not accepted by a slave device until an inputting of image data is completed, thus the slave device (for instance, the bar code reader 1) cannot quickly respond to a control command output from the host system 12 and, namely, the slave device cannot promptly respond as intended by an operator. The present invention is created to eliminate the above described drawbacks of the prior art.

It is, therefore, an object of the present invention to provide an information reading device which can increase a read completion rate by controlling a communication interrupt from a host system and also can quickly make a response as intended by an operator.

SUMMARY OF THE INVENTION

To achieve the foregoing object, in accordance with an aspect of the present invention, as illustrated in FIG. 2(a), there is provided an information reading device for use in a system in which a plurality of slave devices are connected to a master unit through a common signal line. The information reading device is employed as the slave devices and comprises irradiation means for irradiating electromagnetic waves on a recording medium (for example, a bar code), on which a plurality of codes are described, and signal converting means (for example, a CCD line sensor) for obtaining information signals representing the codes from electromagnetic waves reflected from the recording medium and storing the information signal the device further comprises driving means for outputting a driving signal to the signal converting means and causing the signal converting means to serially output the information signals stored therein, and code information output means for storing the information signals output from the signal converting means to form code information, converting the code information and outputting a signal representing a result of the conversion of the code information to the master unit. The device further includes judgement means for determining whether or not an interrupt signal is input from the master unit to the information reading device, interrupt processing means for performing an interrupt processing in response to the interrupt signal if the judgement means determines that the interrupt signal is input from the host system to the information reading device, driving signal control means for making the driving means stop outputting the driving signal if the judgement means determines that the interrupt signal is input from the master unit to the information reading device, and for making the driving means resume outputting the driving signal when the interrupt processing means finishes the interrupt processing, and code control means for making the code information outputting means convert the code information by removing data represented by the signal output from the signal converting means when the interrupt processing means performs the interrupt processing.

Thus, when an interrupt signal is input from the master unit to the information reading device, the driving signal control means makes the driving means stop generating the driving signal. Thereby, the signal converting means stops outputting the information signal. Further, when the interrupt processing means finishes the interrupt processing, the driving signal control means makes the driving means resume generating the driving signal. Thus, the information signals stored in the signal converting means are serially output therefrom. Further, the code control means makes the code information outputting means convert the code information by removing data represented by the signal output from the signal converting means when the interrupt processing means performs the interrupt processing. Thus the information reading device can prevent the code information from becoming inaccurate due to the interrupt processing and output accurate code information to the master unit. Namely, the information signal is not output from the signal converting means when the interrupt processing is performed in response to the interrupt signal input from the master unit. When the interrupt processing is completed, the signal converting means resume outputting the information signal. It is not necessary to read the code information again in case where an interrupt from the master unit to the information reading device occurs. Moreover, the accurate code information can be output from the information reading device to the master unit by being provided with the code control means. Thereby, the information reading device has excellent effects in that the code information can be accurately read and a read completion rate can be increased.

Further, it is determined by the judgement means whether or not an interrupt signal is input from the master unit to the information reading device. Moreover, the output of the information signal from the signal converting means is stopped or permitted according to the result of the determination. Thus an interruption from the master unit is always permitted. Thereby, the information reading device has another excellent effect in that the information reading device can quickly respond as intended by an operator.

Further, in accordance with another aspect of the present invention, as illustrated in FIG. 2(b), there is provided an information reading device for use in a system in which a plurality of slave devices are connected to a master unit through a common signal line. The information reading device is employed as one of the slave devices and comprises irradiation means for irradiating electromagnetic waves on a recording medium (for example, a bar code), on which a plurality of codes are described, signal converting means (for example, a CCD line sensor) for obtaining information signals representing the codes from electromagnetic waves reflected from the recording medium and storing the information signal, and driving means for outputting a driving signal to the signal converting means and causing the signal converting means to serially output the information signals stored therein. The device further comprises judgement means for determining whether or not an interrupt signal is input from the master unit to the information reading device, interrupt processing means for performing an interrupt processing in response to the interrupt signal if the judgement means determines that the interrupt signal is input from the host system to the information reading device and driving signal control means for making the driving means stop outputting the driving signal if the judgement means determines that the interrupt signal is input from the master unit to the information reading device, and for making the driving means resume outputting the driving signal when the interrupt processing means finishes the interrupt processing. The device further includes storage means for receiving the information output from the signal converting means, storing the received information signal to form code information and inhibiting the receiving of the information signal from time, at which the interrupt processing means starts performing the interrupt processing, until a time at which the interrupt processing means finishes the interrupt processing, and code converting means for converting the code information stored in the storage means and outputting a result of the conversion of the code information to the master unit.

Thus, when an interrupt signal is input from the master unit to the information reading device, the driving signal control means makes the driving means stop generating the driving signal. Thereby, the signal converting means stops outputting the information signal. Further, when the interrupt processing means finishes the interrupt processing, the driving signal control means makes the driving means resume generating the driving signal. Thus, the information signals stored in the signal converting means are serially output therefrom. Further, the storage means receives the information output from the signal converting means, and stores the received information signal to form code information and inhibits the receiving of the information signal from time, at which the interrupt processing means starts performing the interrupt processing, until a time at which the interrupt processing means finishes the interrupt processing. Thus the code converting means converts the code information without inputting and storing unnecessary information. Thereby, the information reading device can prevent the code information from becoming inaccurate due to the interrupt processing and output accurate code information to the master unit. Moreover, the information signal is not output from the signal converting means when the interrupt processing is performed in response to the interrupt signal input from the master unit. When the interrupt processing is completed, the signal converting means resume outputting the information signal. It is therefore unnecessary to read the code information again in case where an interrupt from the master unit to the information reading device occurs. Furthermore, the code converting means can convert the code information without inputting and storing unnecessary information corresponding to a period in which the interruption processing is performed, by being provided with the storage means. Thereby, the information reading device has excellent effects in that the code information can be accurately read by preventing the code information from being inaccurate due to the interrupt processing without performing a step of removing the unnecessary information and in that a read completion rate can be increased.

Further, it is determined by the judgement means whether or not an interrupt signal is input from the master unit to the information reading device. Moreover, the output of the information signal from the signal converting means is stopped or permitted according to the result of the determination. Thus an interruption from the master unit is always allowed. Thereby, the information reading device has another excellent effect in that the information reading device can quickly respond as intended by an operator.

Moreover, in accordance with still another aspect of the present invention, as illustrated in FIG. 2(c), there is provided an information reading device for use in a system in which a plurality of slave devices are connected to a master unit through a common signal line. The information reading device is employed as one of the slave devices and comprises signal converting means (for example, a CCD line sensor) for irradiating electromagnetic waves on a recording medium (for example a bar code), on which a plurality of codes are described, and for obtaining information signals representing the codes and for storing the information signal, driving means for outputting a driving signal to the signal converting means and causing the signal converting means to serially output the information signals stored therein, and converting means for storing the information signals output from the signal converting means to form code information, converting the code information and outputting a signal representing a result of the conversion of the code information to the master unit. The device further comprises judgement means for determining whether or not an interrupt signal is input from the master unit to the information reading device, interrupt processing means for performing an interrupt processing in response to the interrupt signal if the judgement means determines that the interrupt signal is input from the host system to the information reading device, first control means for making the driving means stop outputting the driving signal if the judgement means determines that the interrupt signal is input from the master unit to the information reading device, and for making the driving means resume outputting the driving signal when the interrupt processing means finishes the interrupt processing and second control means for making the code converting means convert the code information by removing data represented by the signal output from the signal converting means when the interrupt processing means performs the interrupt processing.

With the above described configuration, the signal converting means irradiates electromagnetic waves on a recording medium, on which a plurality of codes are described, and obtains information signals representing the codes and stores the information signal. The driving means outputs a driving signal to the signal converting means and causes the signal converting means to serially output the information signals stored therein. Further, the code converting means stores the information signals output from the signal converting means to form code information, and converts the code information and outputs a signal representing a result of the conversion of the code information to the master unit.

Moreover, the judgement means determines whether or not an interrupt signal is input from the master unit to the information reading device. The interrupt processing means performs an interrupt processing in response to the interrupt signal if the judgement means determines that the interrupt signal is input from the host system to the information reading device. The first control means makes the driving means stop outputting the driving signal if the judgement means determines that the interrupt signal is input from the master unit to the information reading device, and makes the driving means resume outputting the driving signal when the interrupt processing means finishes the interrupt processing. Furthermore, the second control means makes the code converting means convert the code information by removing data represented by the signal output from the signal converting means when the interrupt processing means performs the interrupt processing.

Thus, when an interrupt signal is input from the master unit to the information reading device, the first control means makes the driving means stop generating the driving signal. Thereby, the signal converting means stops outputting the information signal. Further, when the interrupt processing means finishes the interrupt processing, the first control means makes the driving means resume generating the driving signal. Thus, the information signals stored in the signal converting means are serially output therefrom.

Further, the second control means makes the code information outputting means convert the code information by removing data represented by the signal output from the signal converting means when the interrupt processing means performs the interrupt processing. Thus the information reading device can prevent the code information from becoming inaccurate due to the interrupt processing and output accurate code information to the master unit.

Moreover, the information signal is not output from the signal converting means during the interrupt processing is performed in response to the interrupt signal input from the master unit. When the interrupt processing is finished, the signal converting means resume outputting the information signal. Consequently, it is not necessary to read the code information again in case where an interrupt from the master unit to the information reading device occurs. Moreover, the accurate code information can be output from the information reading device to the master unit by being provided with the second control means. Thereby, the information reading device has advantages in that the code information can be accurately read and a read completion rate can be increased.

Further, it is determined by the judgement means whether or not an interrupt signal is input from the master unit to the information reading device. Moreover, the output of the information signal from the signal converting means is stopped or permitted according to the result of the determination. Thus an interruption from the master unit is always permitted. Thereby, the information reading device has another advantage in that the information reading device can promptly respond as intended by an operator.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which.

DETAILED DESCRIPTION OF THE PREFERRED EMBODIMENTS

Hereinafter, preferred embodiments of the present invention will be described in detail by referring to the accompanying drawings. Incidentally, these preferred embodiments are portable or handy bar code readers according to the present invention.

Figure 1:
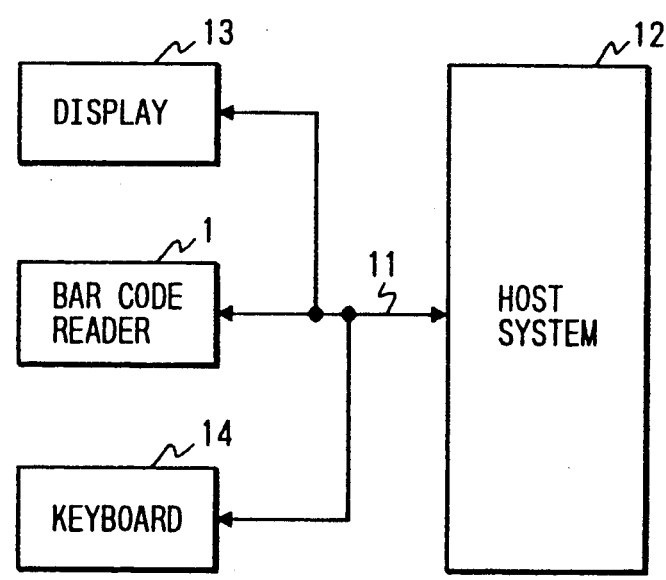
FIG. 1 is a schematic block diagram for illustrating a conventional POS system provided with one master unit and a large number of slave device.
Figure 2A:
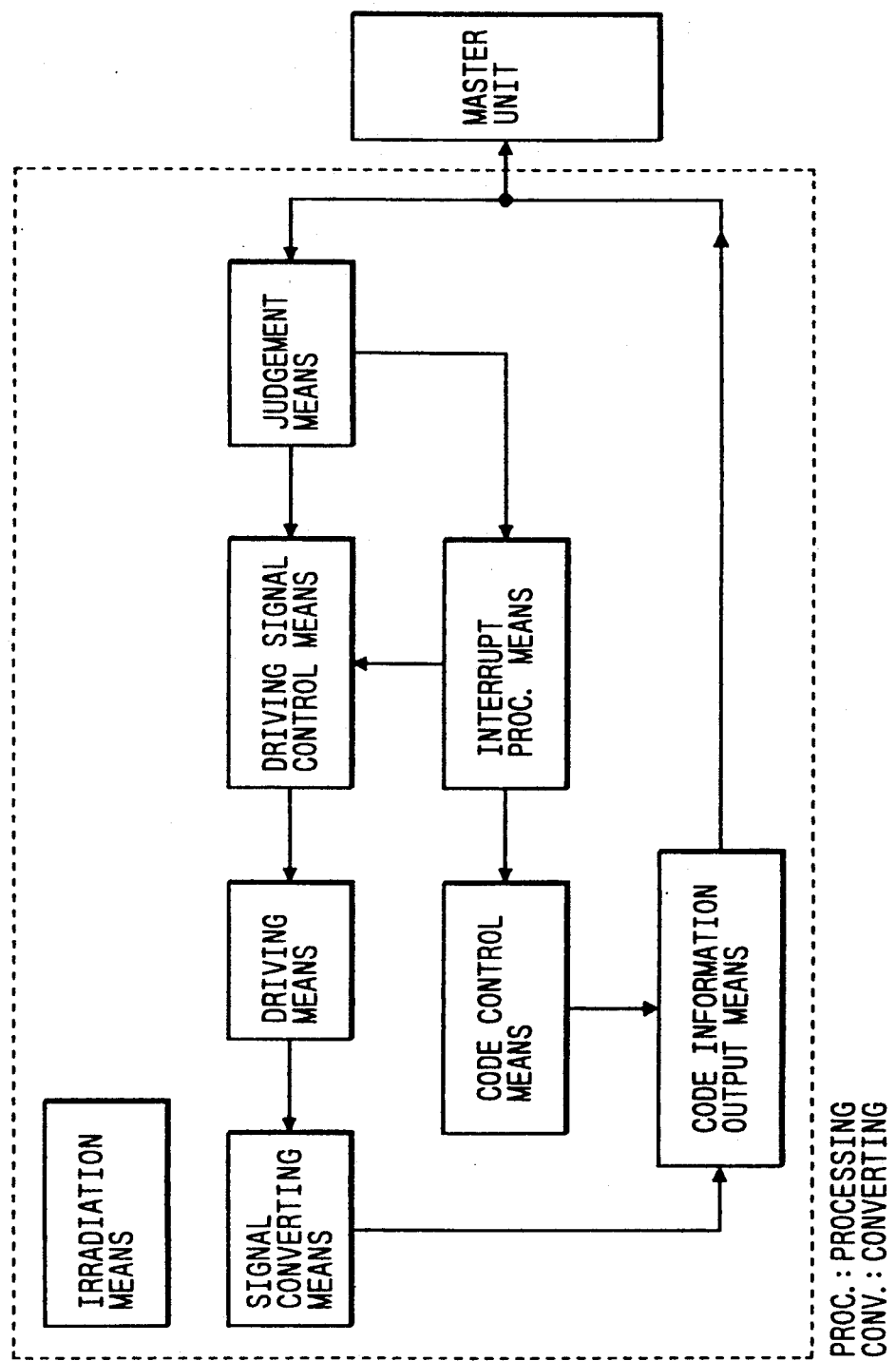
FIGS. 2(a), (b) and (c) are schematic block diagrams respectively showing outlines of the structures of embodiments of the present invention.
Figure 2B:
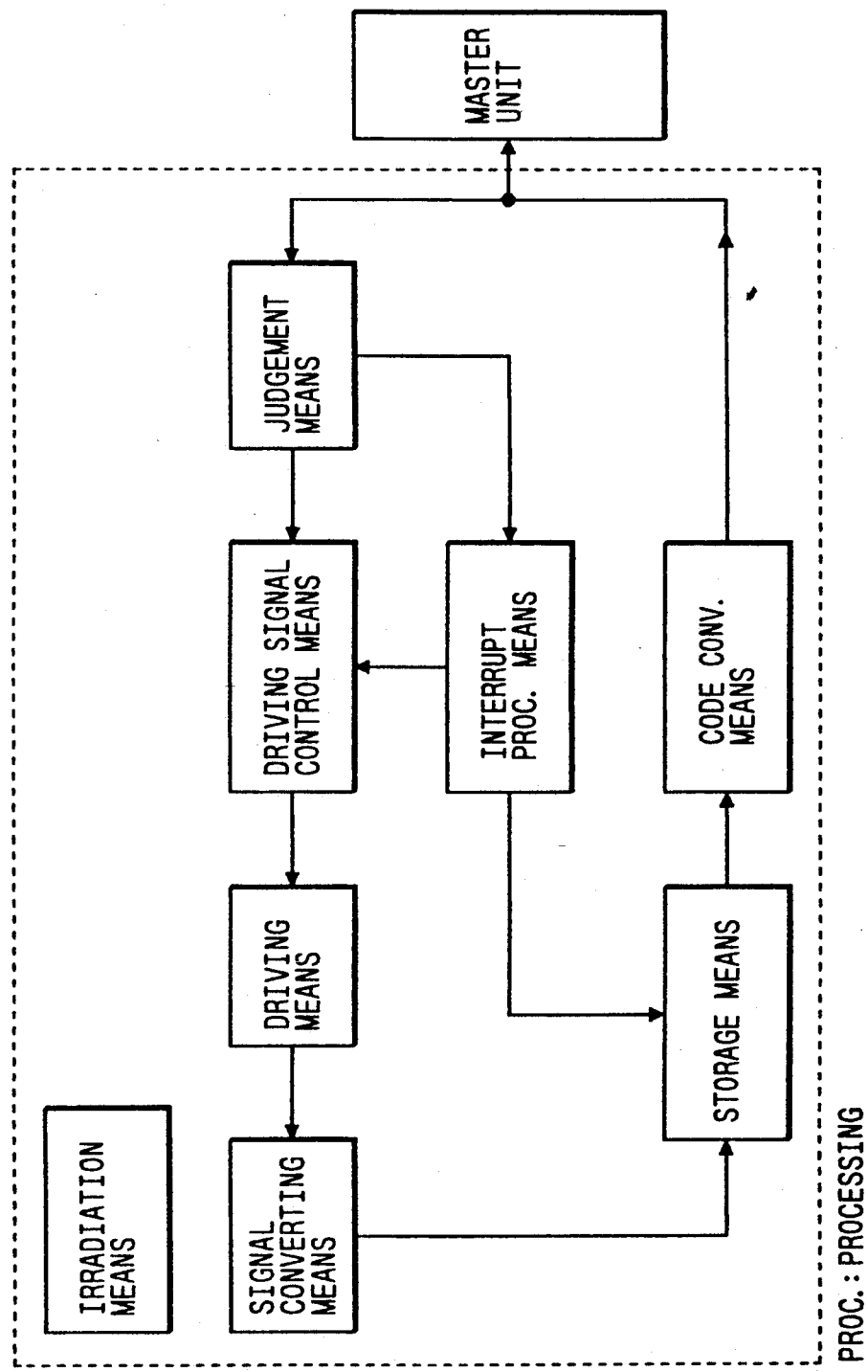
Figure 3:
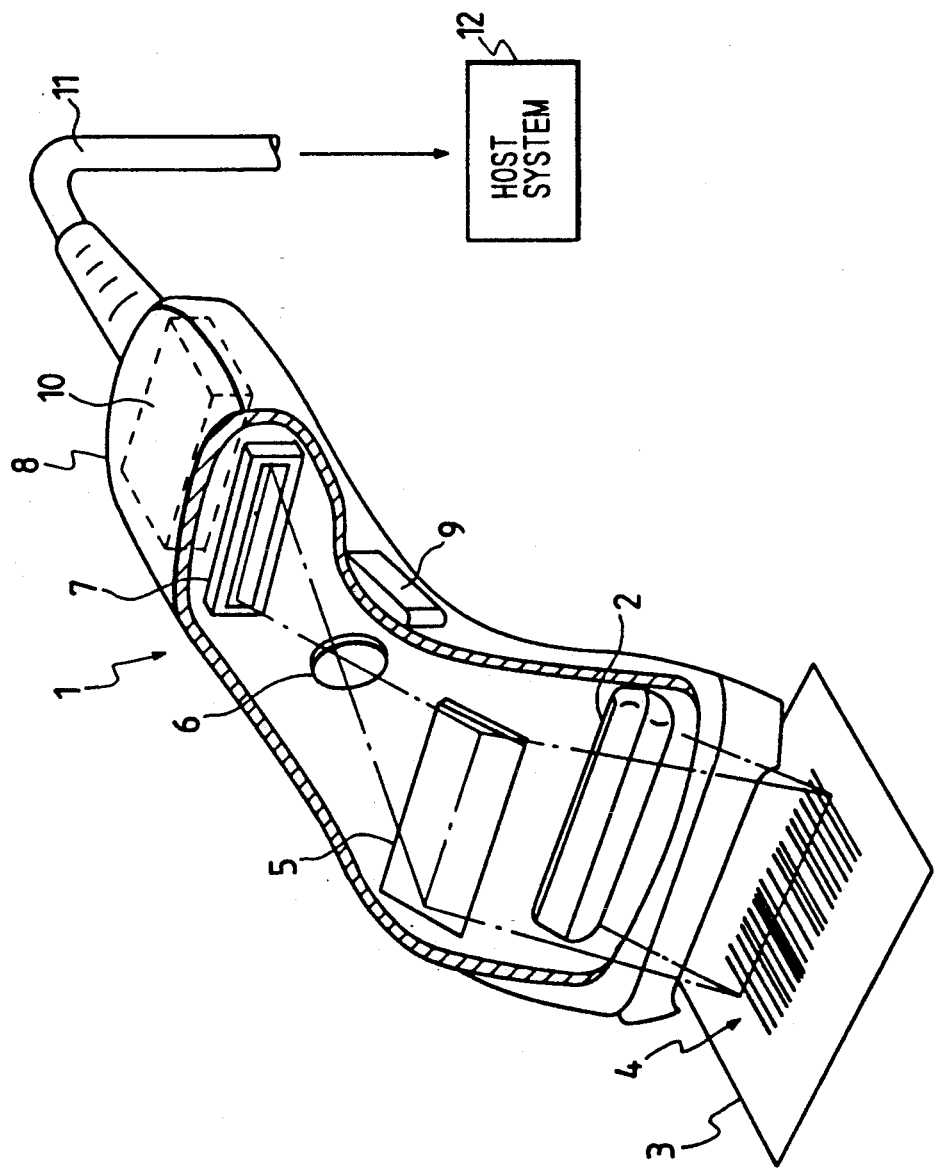
FIG. 3 is a partially cutaway view of a bar code reader embodying the present invention.

FIG. 3 is a diagram for illustrating the internal construction of the bar code reader embodying the present invention.

In this figure, reference numeral 8 indicates a casing made of electrically insulated resin; and 9 a switch provided at a side of the bar code reader 1. An operation of reading a bar code 4 representing optical information is started by pressing this switch 9.

A light source 2 for illumination composed of a red light emitting diode is adapted to uniformly irradiate irradiation light to a space of a predetermined range. The irradiation light irradiated from the light source 2 is incident on the bar code 4 printed on a label 3 made of a recording medium and is reflected at the surface of the bar code 4.

The direction, in which the irradiation light reflected at the surface of the bar code 4 travels, is changed by a plane reflecting mirror 5. Then, the irradiation light, the course of which is thus changed, is converged by a converging lens 6, and an image of the bar code 4 is formed at an image sensor 7 which is a signal transformation means.

The image sensor 7 is of the linear type that a large number of photoelectric elements are arranged in a line. Further, the spectral sensitivity of the image sensor 7 has a peak region in the vicinity of a peak of an emission spectrum of light irradiated from the illumination light source 2. Moreover, an information signal (namely, a signal indicating information represented by the bar code 4) is obtained by performing a photoelectric conversion of irradiated light which is incident on the image sensor 7. Incidentally, the image sensor 7 has a function of storing the information signal obtained as the result of the photoelectric conversion. When a driving clock $I_o$ (to be described later) is input thereto, information signals obtained by effecting the photoelectric conversion are serially output in accordance with the number of the input driving clocks $I_o$. In contrast, when no driving clocks $I_o$ are input to the sensor 7, the information signals obtained by effecting the photoelectric conversion are stored and held therein until a driving clock $I_o$ is input thereto.

An electronic control unit (ECU) 10 is comprised of an image sensor driving portion (corresponding to drive means) for driving the image sensor 7, a signal processing portion for performing electric processings such as an amplification and a binarization on information signals output from the image sensor 7, a decode processing portion (corresponding to code information output means) for performing a decode processing (namely, a bar-code/character-code transformation) on the electric signals (namely, the binary information signals) output from the signal processing portion, and a communication control portion for responding to a communication interrupt from the host system 12.

Further, a character-code signal output from the decode processing portion is input through the cable 11 to the host system 12 whereupon information represented by the bar code 4 is read.

Next, the detailed construction of the ECU 10 will be described hereinbelow.

Figure 4:
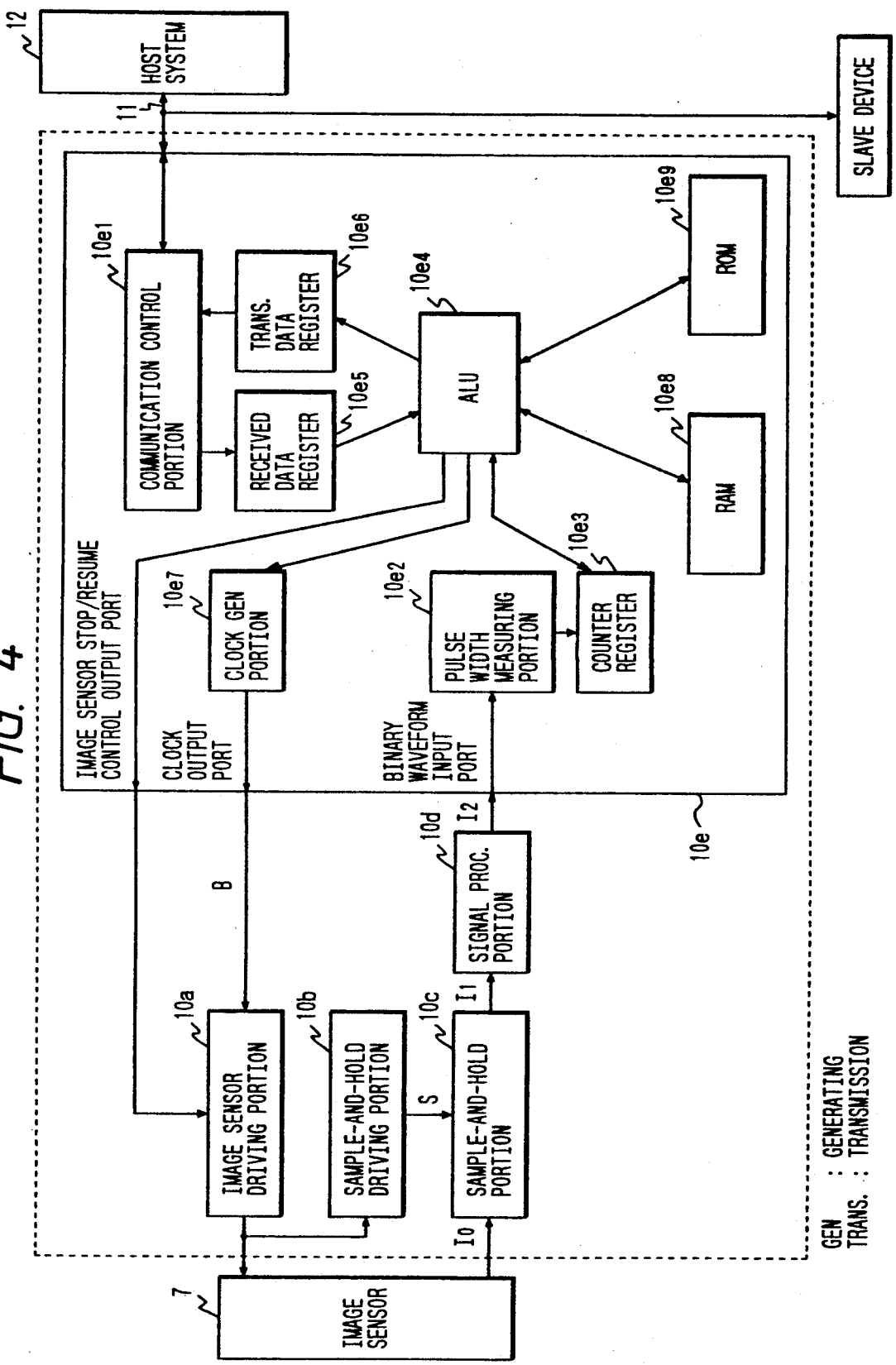
FIG. 4 is a schematic block diagram for illustrating the construction of an electronic control unit (ECU) of the embodiment of FIG. 3.

FIG. 4 is a schematic block diagram for illustrating the detailed construction of the ECU 10. As shown in this figure, a CPU 10e consists of a communication control portion $10e_1$ for receiving an interrupt signal output from the host system through the cable 11, a pulse width measuring portion $10e_2$ for measuring a pulse width on the basis of a binary information signal $I_2$, a counter register (corresponding to code information forming means) $10e_3$ for temporarily storing data representing the measured pulse width, a received-data register $10e_5$ for temporarily storing data received from the communication control portion $10e_1$, a transmission data register $10e_6$ for temporarily storing transmission data, a clock generating portion $10e_7$ for generating fundamental clocks B, a RAM $10e_8$, a ROM $10e_9$ and an arithmetic logic unit (ALU) $10e_4$ for controlling the counter register $10e_3$, the received-data register $10e_5$, the transmission data register $10e_6$, the clock generating portion $10e_7$, the RAM $10e_8$ and the ROM $10e_9$. Incidentally, in this embodiment, the pulse width measuring portion $10e_2$ is not controlled by the ALU $10e_4$. Namely, the portion $10e_2$ performs a measurement of a pulse width independently of the ALU $10e_4$. Additionally, primary composing elements of the decode processing portion are the pulse width measuring portion $10e_2$, the counter register $10e_3$ and the ALU $10e_4$.

The image sensor driving portion $10a$ receives the fundamental clocks B generated from the clock generating portion $10e_7$ and generates driving clocks $I_c$ to be used for driving the image sensor 7. Further, the image sensor driving portion $10a$ has functions of stopping and starting the generation of the driving clocks $I_c$ in response to an interrupt processing by the CPU $10e$.

The driving clocks $I_c$ generated by the image sensor driving portion $10a$ are input to both of the image sensor 7 and a sample-and-hold driving portion $10b$. This sample-and-hold driving portion $10b$ receives the driving clock $I_c$ and generates a timing signal S indicating time, at which a sample-and-hold portion 10c starts effecting a sample-and-hold operation.

The image sensor 7 receives the driving clock $I_c$ generated by the image sensor driving portion 10a and outputs information signals $I_0$ obtained by performing a photoelectric conversion of irradiated light serially. At that time, the information signal $I_0$ is synchronized with the driving clock $I_c$. When the voltage level of the driving clock $I_c$ is high, an output of the image sensor 7 changes according to a quantity of light converged thereto (namely, changes between a level corresponding to a bar and another level corresponding to a space). In contrast, when the voltage level of the driving clock $I_c$ is low, an output of the image sensor 7 comes to have no relation with a quantity of light converged thereto (namely, comes to have a level corresponding to dummy data).

The sample-and-hold portion 10c receives the information signal $I_0$ from the image sensor 7 and then performs a sample-and-hold operation and outputs a sampling signal $I_1$ to the signal processing portion 10d. At that time, the sample-and-hold operation is performed at a moment determined on the basis of the timing signal S generated by the sample-and-hold driving portion 10b.

The signal processing portion 10d receives the sampling signal $I_1$ and amplifies the signal $I_1$ and performs a binarization of data represented by the signal $I_1$ and then outputs a binary data signal $I_2$ to the CPU 10e.

Next, an operation of this embodiment having the above described configuration will be described hereinbelow.

First, will be described hereinafter an operation of the bar code reader 1 in case where no communication interrupts from the host system 12 occur.

When an operator presses the switch 9 of the reader 1 of FIGS. 3 and 4, irradiation light is irradiated from the illumination light source 2. The irradiation light is incident on the bar code 4 printed on the label 3 and is then reflected at the surface of of the bar code 4. The course of the irradiation light reflected at the surface of the bar code 4 is changed by the plane reflecting mirror 5. Subsequently, the irradiation light is converged by the converging lens 6. Consequently, an image of the bar code 4 is formed on the image sensor 7.

The irradiation light input to the image sensor 7 is converted therein into the information signal $I_0$ as a result of a photoelectric conversion. Namely, the image sensor 7 outputs the information signal $I_0$ in response to the driving signal $I_c$ generated by the image sensor driving portion 10a.

The information signal $I_0$ output from the image sensor 7 is input to the sample-and-hold portion 10c which performs a sample-and-hold operation and then outputs the sampling signal $I_1$ to the signal processing portion 10d. After the amplification and binarization of the sampling signal $I_1$, the signal processing portion 10d outputs the binary information signal $I_2$.

When the binary information signal $I_2$ is input to the CPU 10e, the pulse width measuring portion $10e_2$ measures the pulse width of each pulse of the signal $I_2$. Each time a measurement of a pulse width thereof is completed, a measured number or value of counts of clocks (hereunder referred to as a measured count value) is stored in the counter register $10e_3$. Incidentally, a first measured-count-value is temporarily stored in the count register $10e_3$ as corresponding to white (namely, corresponding to a space) and thereafter is stored at a corresponding address of the RAM $10e_8$ through the ALU $10e_4$. Further, every time the voltage level of a pulse changes from, for example, a high level H ($S_n$) to a low level L ($B_n$) and further varies from, for instance, L ($B_n$) to H ($S_{n+1}$) as illustrated in FIGS. 7(a) and (b), the pulse width measuring portion $10e_2$ determines that what the pulse represents is changed from a space to a bar or from a bar to space, and the operation of temporarily storing the measured count value in the counter register $10e_3$ and storing the measured count value at a corresponding address of the RAM 10e through the ALU $10e_4$ is repeated.

Figure 7:
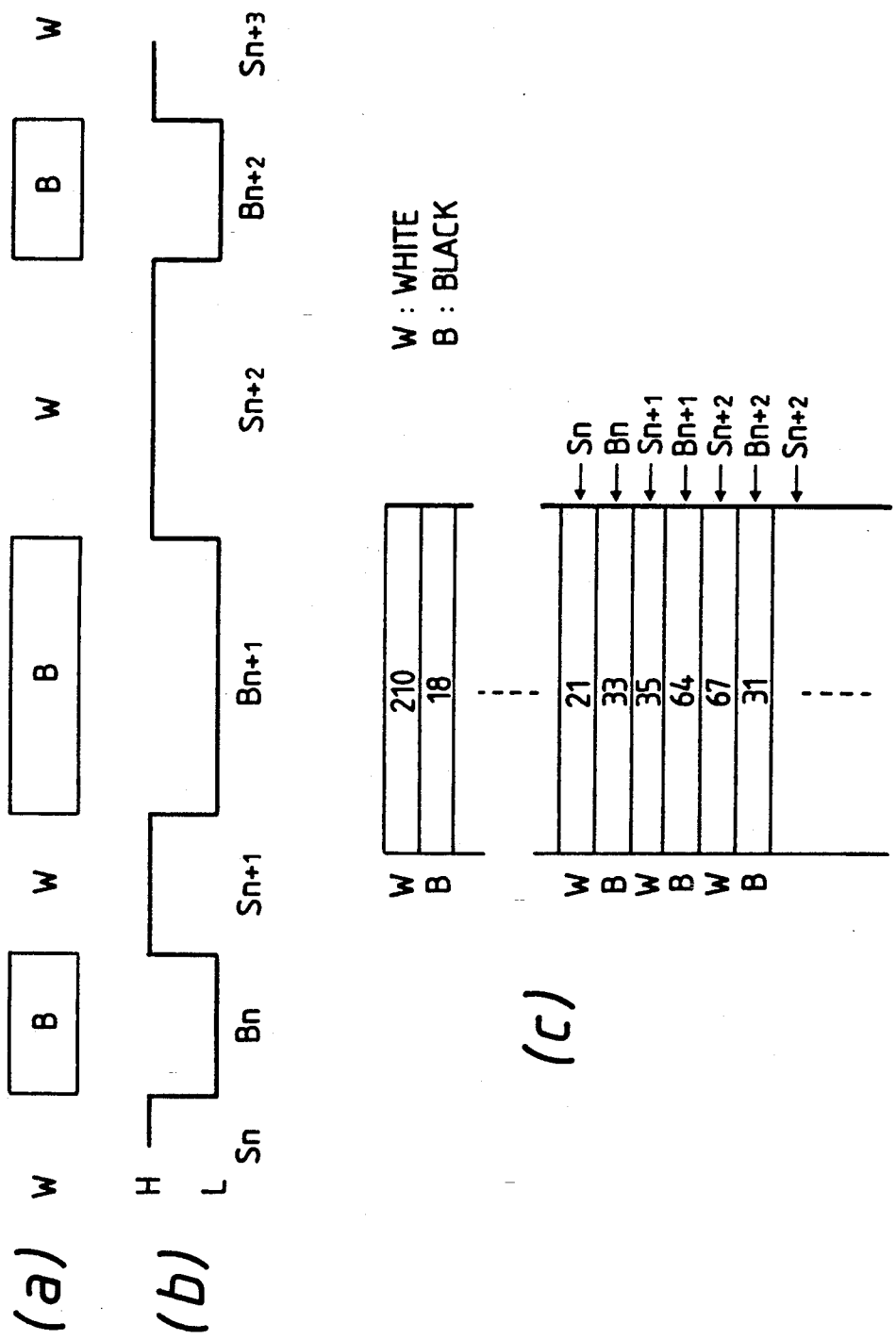
FIG. 7 is a diagram for illustrating a storage condition of a random access memory (RAM) provided in the CPU.

Namely, as illustrated in FIG. 7(c), a pulse width of a first pulse (namely, a margin) of the signal representing bar code data is invariably set as corresponds to a space. Thus, information representing the space is stored in a corresponding storage area of the RAM $10e_8$ as corresponding to 210 counts, and this has come to be shown in the memory map of the RAM $10e_8$. Similarly, when the pulse level changes from H to L, it is judged that what a pulse represents is changed from a space to a bar. Thus, information representing the bar is stored in the RAM $10e_8$ as corresponding to 18 counts. Thereafter, data representing the space $S_n$, the bar $B_n$ and the space $S_{n+1}$ are successively stored in the RAM $10e_8$ as respectively corresponding to 21 counts, 33 counts and 35 counts.

Upon completion of an operation of storing data representing one bar code in the RAM $10e_8$, the ALU $10e_4$ reads the data representing the count values stored in the RAM as above described therefrom and then performs a bar-code/character-code conversion of the read data and finally outputs a character-code signal representing the resultant character-code to the host system 12 through the communication control portion $10e_1$ and the cable 11. The host system 12 receives the character code signal to thereby read the code information represented by the bar code 4.

Next, an operation of the bar code reader 1 in case where a communication interrupt from the host system 12 thereto occurs will be described hereinafter by referring to FIG. 5.

Figure 5:
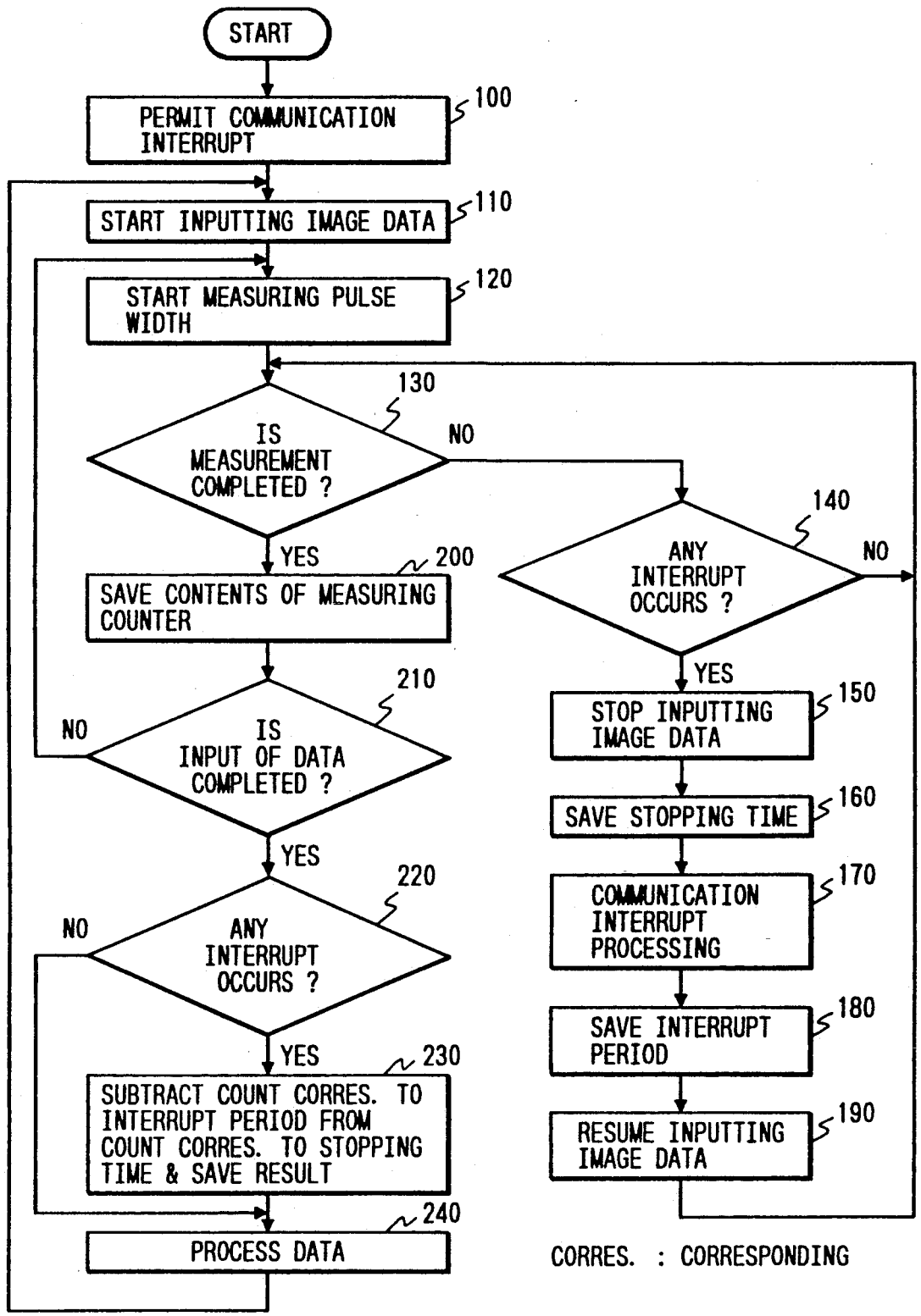
FIG. 5 is a flowchart for illustrating an operation of a CPU of the ECU of FIG. 4.

FIG. 5 is a flowchart a program for performing an operation of the CPU 10e. As shown in FIG. 5, in step 100, an initial setting of the bar code reader of FIG. 3 is effected such that a communication interrupt is permitted by the ALU $10e_4$ of FIG. 4. Subsequently, the program advances to step 110.

In step 110, the ALU $10e_4$ causes the image sensor driving portion 10a to start generating fundamental clocks B for making the image sensor 7 output the stored information signal $I_0$ indicating the information represented by the bar code 4. Thereby, the information signal $I_0$ is output from the image sensor 7. Thereafter, the binary information signal $I_2$ obtained by the sample-and-hold portion 10c and the signal processing portion 10d are input to the pulse width measuring portion $10e_2$. Then, the program advances to step 120.

In step 120, the pulse width measuring portion $10e_2$ starts measuring the pulse width of the binary information signal $I_2$ obtained by performing an electric processing on the information signal $I_0$ stored in the image sensor 7. Subsequently, the program enters step 130.

In step 130, it is determined whether or not the measurement of the pulse width of a pulse of the binary information signal $I_2$ is completed by the pulse width measuring portion $10e_2$. As described above, this judgement is effected by detecting the change in level of the pulse between H and L. If it is judged that the measurement of the pulse width of a pulse of the binary information signal is completed, the program goes forward to step 200. If it is judged that the measurement of the pulse width of a pulse is not completed, the program enters step 140.

In step 140, the ALU $140e_4$ determines from the state of the received data register $10e_5$ whether or not the communication control portion $10e_1$ receives a communication interrupt from the host system 12. If there is a received communication interrupt, the program advances to step 150. Otherwise, the program returns to step 120. Incidentally, this step 140 corresponds to the judgement means.

If there a communication interrupt occurs from the host system 12 during the binary information signal $I_2$ is input to the portion $10e_2$, an interrupt program or process composed of steps 150 to 190 (to be described later) is performed according to the results of the judgement of steps 120 and 140. Incidentally, steps 150 to 190 correspond to the driving signal control means.

In step 150, the AL $10e_4$ outputs a stop signal to be used for causing the image sensor driving portion $10a$ to cease the generation of the driving clocks $I_c$ with the aim of stopping the input of the binary information signal $I_2$ once. Consequently, the driving clock $I_c$ is not generated by the image sensor driving portion $10a$. Further, the image sensor 7 does not output but stores the information signal $I_0$. Incidentally, the image sensor 7 maintains the signal level of the signal output from the image sensor 7 and keeps the output therefrom when the generation of the driving clock $I_0$ is stopped.

Subsequently, in step 160, the time (hereunder sometimes referred to as the communication interrupt starting time), at which the stop signal to be used for causing the image sensor driving portion $10a$ to stop the generation of the driving clocks $I_c$ is output by the ALU $10e_4$, is stored in the RAM $10e_8$. The reason of storing data indicating the communication interrupt starting time and communication interrupt finishing time in the RAM is to use such data for correcting image data in step 230 to be described later. After the communication interrupt starting time is stored in the RAM, the program advances to step 170.

In step 170, a processing indicated by a control command sent at the communication interrupt from the host system 12 is performed. For example, in case where the host system 12 receives an operation changing command, which directs that the number of digits of the bar code to be read is changed from 15 to 10, from a keyboard 14, a control command corresponding to the operation changing command is output from the host system 12 as a communication interrupt. The ALU $10e_4$ of the CPU $10e$ of the bar code reader 1 changes the number of the digits from 15 to 10 in step 170. Incidentally, this step 170 corresponds to the interrupt processing means.

Upon completion of the processing of step 170, the program advances to step 180 whereupon the time, at which the ALU $10e_4$ finishes the processing in step 170, is stored in the RAM $10e_8$ in step 180. Then, the program goes forward to step 190.

In step 190, the ALU $10e_4$ outputs an operating signal, which causes the image sensor driving portion $10a$ to resume the generation of the driving clock $I_o$, with intention of making the image sensor 7 resume outputting the information signal $I_0$. Thereby, the image sensor driving portion $10a$ generates the driving clock $I_o$ and the image sensor 7 outputs the information signal $I_0$ stored therein to the sample-and-hold portion $10c$.

When the execution of the interrupt processing of steps 150-190 is completed, the program returns to step 130 whereupon it is determined again whether or not the measurement of a pulse of the binary information signal $I_2$ is finished. Further, the determination of steps 130 and 140 is repeated until the measurement of the pulse width of a pulse of the binary information signal $I_2$ is completed, in case where there is no communication interrupt from the host system 12 by the time at which the input of the binary information signal $I_2$ is finished.

Upon completion of the measurement of the pulse width of a pulse of the binary information signal $I_2$, the program advances from step 130 to step 200 whereupon the measured count value (corresponding to the pulse width of a pulse) is stored at a corresponding address of the RAM. Then, the program goes forward to step 210 whereupon it is determined whether or not all of the data of one bar code, which are represented by the binary information signal $I_2$, are input to the reader. If it is determined in step 210 that all of the data are not input thereto, the processing of steps 110 to 200 is repeated until all of the data are input thereto. Conversely, if it is determined in step 210 that all of the data are input thereto, the program advances to step 220. Incidentally, this determination is made in step 210 on the basis of whether or not a time (hereunder sometimes referred to as an elapsed time) having elapsed since the beginning of the inputting of the data of the bar code exceeds a predetermined reference time. Namely, the reference time is preliminarily set according to the storage capacity of the image sensor 7. Further, when the elapsed time exceeds the reference time, the inputting of the data represented by the binary information signal $I_2$ is treated as completed. Incidentally, in case where a communication interrupt occurs during the data are input, the determination is made in step 210 on the basis of whether or not the elapsed time including a period of time of the communication interrupt exceeds the predetermined reference time.

In step 220, it is determined whether there has occurred any communication interrupt from the host system 12 before the inputting of the data of one bar code is completed. If no communication interrupt occurs, the program exits therefrom to step 240. In contrast, if there has occured such a communication interrupt, the program exits from step 220 to step 230.

In step 230, image data of one bar code, which are stored in the counter register $10e_3$, are input to the ALU $10e_4$ which performs of a correction of the image data. This correction is performed by using the communication interrupt starting time ($t_a$) and the communication interrupt finishing time ($t_b$). Further, image data input in a communication interrupt period $t_{ab}$ between the time $t_a$ and the time $t_b$ are removed from image data to be treated as input at the time of performing the communication interrupt. Incidentally, step 230 corresponds to the code control means.

Namely, the CPU $10e$ stores the communication interrupt starting time and the communication interrupt finishing time measured or represented by setting the time, at which the information reading device (namely, the bar code reader) is activated, as 0 second. Moreover, the CPU $10e$ stores an address of the count register $10e_3$, at which a count value (represented by the corresponding image data and) treated as measured at the time of performing the communication interrupt is stored. Then, at the time of the data correction of step 230, a count value corresponding to the communication interrupt period $t_{ab}$ is subtracted from the count value stored at such an address of the count register $10e_3$. Thereby, unnecessary image data can be removed. Upon completion of the correction, the program advances to step 240.

In step 240, the ALU $10e_4$ performs a decode processing on the corrected binary information signal. Further, when the decode processing is completed, a character-code signal, on which the decode processing has been performed, is temporarily stored in the transmission data register $10e_6$. Further, when a control command (namely, a command directing the bar code reader to transmit bar code data to the host system 12) is input thereto from the host system 12, the bar code reader outputs the bar code data to the host system 12 through the communication control portion $10e_1$ and the cable 11. The host system 12 reads code information represented by the bar code 4. Incidentally, step 240 corresponds to the code conversion means.

Next, it will be described hereinbelow how the voltage level or waveform of each of the clock and electric signals varies with time.

Figure 6:
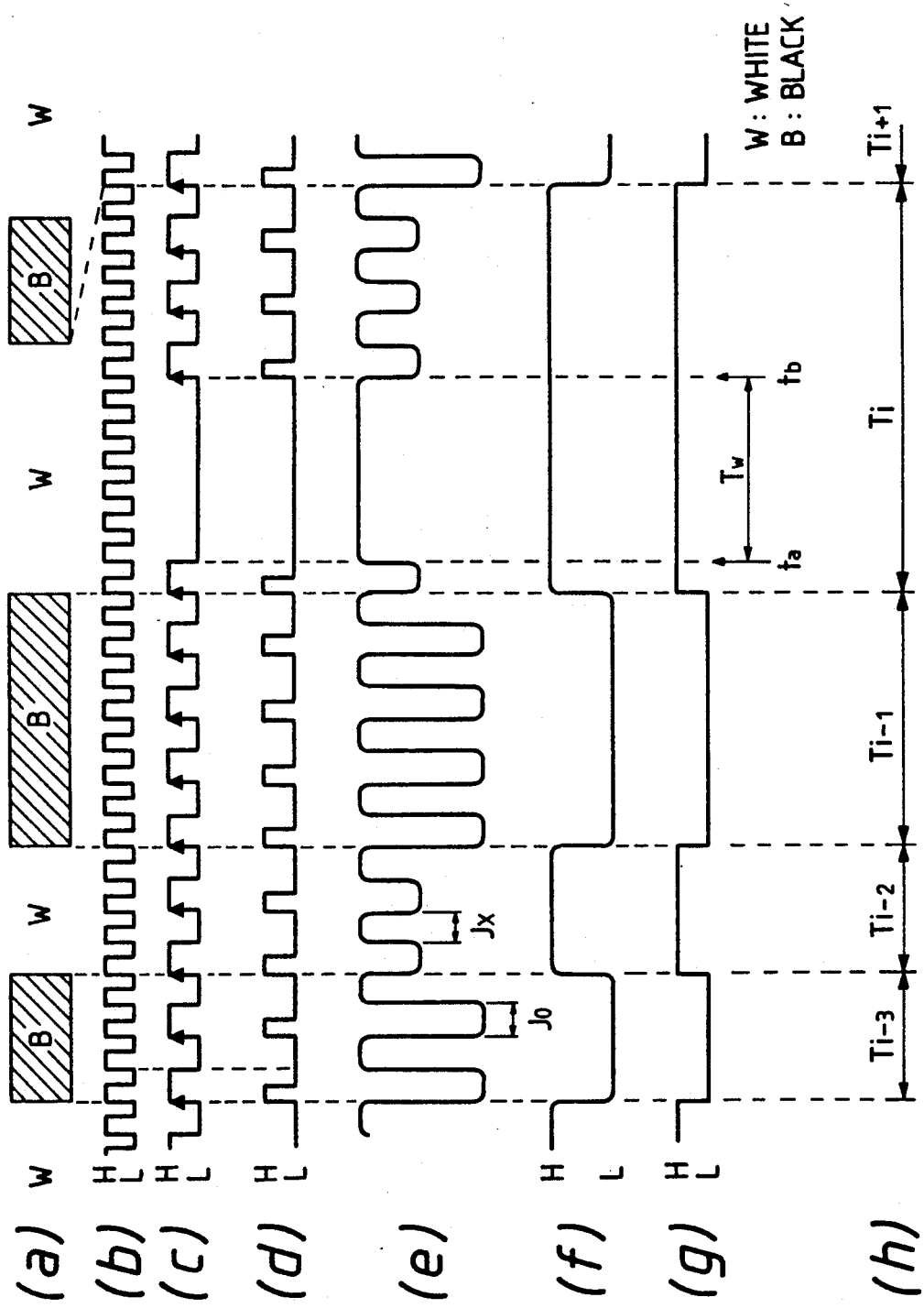
FIG. 6 is a timing chart for illustrating voltage waveforms of clock and electric signals used in the embodiment of FIG. 3.

FIG. 6 is a timing chart for showing how the voltage waveforms of the clock and electric signals vary with time. FIG. 6(a) shows a partially enlarged view of the baR CODE 4. In this figure, shaded portions represent bars; and other white portions spaces. FIG. 6(b) shows the waveform of the fundamental clock B generated by the CPU 10e. FIG. 6(c) the waveform of the driving clock $I_o$ generated by the image sensor driving portion 10a. Incidentally, an H-period of the driving clock $I_o$, in which the voltage level is a high level H, is set as equal to a period of the fundamental clock B such that the clock $I_o$ is not affected to timing of a communication interrupt.

Further, FIG. 6(d) shows the waveform of the timing signal S generated by the sample-and-hold driving portion 10b. The timing signal S rises in synchronization with that of the driving clock $I_o$ of FIG. 6(c). Further, the H-period of the timing signal S is shorter than that of the driving clock $I_o$. Namely, the sample-and-hold driving portion generates the timing signal S in such a manner to perform a sample-and-hold operation in the H-period thereof shorter than that of the driving clock $I_o$.

FIG. 6(e) shows the waveform of the information signal $I_0$ which is output from the image sensor 7 and is synchronized with the driving clock $I_o$. The information signal $I_0$ has an output level $j_o$ corresponding to a quantity of light converged on the image sensor 7 when the clock $I_o$ is in the H-period thereof. Further, the voltage level of the information signal $I_0$ corresponding to each bar of the bar code 4 becomes low but that of the signal $I_0$ corresponding to each space of the bar code 4 becomes high. Moreover, the information signal $I_0$ has a dummy output level $j_x$, which has no relation with the quantity of light converged on the image sensor 7 when the clock $I_o$ is in an L-period thereof (namely, the voltage level of the clock $I_o$ is a low level L).

FIG. 6(f) illustrates the waveform of the sampling signal $I_1$ output from the sample-and-hold portion 10c, which is obtained by performing a sample-and-hold operation on the information signal $I_0$ output from the image sensor 7.

FIG. 6(g) shows the waveform of the binary information signal $I_2$ which is output from the signal processing portion and is input to the CPU 10e.

Further, in FIG. 6(h), reference characters $T_{i-3}$, $T_{i-2}$, $T_{i-1}$, $T_i$ and $T_{i+1}$ denote pulse widths of pulses of the binary information signal $I_2$, which are measured by the pulse width measuring portion $10e_2$ of the CPU 10e, and also indicate data from the image sensor 7, namely, the widths of bars and spaces of the bar code 4.

In case where a communication interrupt from the host system 12 occurs in the period $T_{ab}$ between the communication interrupt starting time $t_a$ and the communication interrupt finishing time $t_b$, the generation of the driving clock $I_o$ is stopped in response to the stop signal from the CPU 10e as shown in FIG. 6(c).

Then, the information signal $I_0$ is kept output from the image sensor 7 by maintaining the voltage level thereof at the time of stopping the generation of the driving clock $I_o$ due to the fact that the driving clock $I_o$ is not generated. Incidentally, in case of FIG. 6(e), the signal $I_0$ maintains the dummy output level because the generation of the driving clock $I_o$ is stopped when the voltage level of the signal $I_0$ is the dummy output level. Moreover, the generation of pulses of the timing signal S by the sample-and-hold driving portion 10b is stopped as illustrated in FIG. 6(d), and the sample-and-hold portion 10c keeps outputting a signal by maintaining the voltage level (namely, the low level in case of FIG. 6(d)).

Thus, the sample-and-hold operation of the information signal $I_0$ having the voltage level at the time of stopping the generation of the driving clock $I_o$ is kept performed by using the sampling signal $I_1$. Similarly, the binary information signal $I_2$ maintains the output voltage level thereof as is seen from the waveform of FIG. 6(g).

When a communication interrupt from the host system 12 occurs, each of the clock and electric signals has the above described waveform. The CPU 10e corrects the image data input thereto in the communication interrupt period $t_{ab}$ in step 230 of the above described program.

Namely, as illustrated in FIG. 6(h), the count value corresponding to the pulse width $T_i$ (namely, data representing spaces of the pulse width $T_i$) is input to the CPU 10e as the image data to be treated as input at the time of performing the communication interrupt. In step 230, the CPU 10e performs the correction by subtracting the count value corresponding to a pulse width $T_w$ (namely, the image data input thereto in the communication interrupt period $t_{ab}$) from the count value corresponding to the pulse width $T_i$.

Thus, in case of the first embodiment (namely, the bar code reader for use in the POS system in which a large number of slave devices such as a bar code reader, a display and a keyboard are connected to a master unit (i.e., a host system) through a common signal line (namely, a common cable)), a communication interrupt from the host system to the bar code reader is always permitted and therefore the bar code reader can quickly respond as intended by an operator.

Further, when a communication from the host system to the bar code reader of the first embodiment occurs, an output of the image sensor is stopped from the communication interrupt starting time till the communication interrupt finishing time. Furthermore, upon completion of the communication interrupt, the data input to the CPU during the communication interrupt period are corrected. Thus, even when interrupts to the bar code reader 1 or the keyboard 14 take place very frequently (for example, in case where the number of the slave devices is two, interrupts occur almost 1000 times per second), the read completion rate can be increased.

Additionally, the above described processing responsive to a communication interrupt can be performed by the bar code reader which has a simple configuration and is simply controlled. Thus, such a processing can be performed by a single CPU. Further, the miniaturization of the bar code reader can be achieved. Consequently, the present invention can be effectively applied to, for instance, a handy bar code reader, for which the size thereof is very important.

Next, modifications of the first embodiment of the present invention will be described hereinbelow.

In case of the first embodiment, in the interrupt processing, image data input thereto is corrected by subtracting data input in the communication interrupt period therefrom. In contrast, when a communication interrupt from the host system occurs, an operation of the pulse width measuring portion $10e_2$ may be once stopped by making the ALU $10e_4$ control an operation of the portion $10e_2$. Thereby, the input of the binary information signal is inhibited when a communication interrupt from the host system is detected. Thereafter, when the communication interrupt from the host system is completed, the measurement of the count value is resumed from a position next to the position of the bar code, at which an operation of the pulse width measuring portion $10e_2$ is stopped, and the input of the binary information signal $I_2$ is permitted. This modification has advantages in that there is no necessity of correcting the image data and that the control logic can be further simplified.

Moreover, in case of the first embodiment, data of one bar code are once stored in the RAM $10e_8$ and thereafter image data to be treated as input at the time of performing the communication interrupt are corrected by effecting a post processing. However, such correction may be performed at a pre-processing stage. Namely, in case of this modification, when the communication interrupt is completed and the measurement of data of one pulse width is finished, the data corresponding to the pulse width $T_w$ is subtracted from the data corresponding to the pulse width $T_i$ and the thus corrected data are then stored in the RAM $10e_8$.

Furthermore, unnecessary image data can be removed by effecting the following process instead of performing the correction process of step 230 of the first embodiment. Namely, every time image datum is inputted to the CPU, the image datum and corresponding time of inputting thereof measured by setting the time, at which the bar code reader is activated, as 0 second are stored in the RAM. Moreover, the communication interrupt starting time and the communication interrupt finishing time are stored therein. The image data input to the CPU from the communication interrupt starting time till the communication interrupt finishing time are removed from all of the input image data later.

Incidentally, the first embodiment and the modifications thereof are the application of the present invention to a bar code reader. Apparently, the present invention can be applied to, for instance, a magnetic card reader as long as the magnetic card reader is an information reading device employed as a slave device of a system in which a large number of slave devices are connected to a master unit through common signal lines.

Next, another embodiment (hereunder sometimes referred to as a second embodiment) of the present invention will be described hereinafter. Incidentally, the second embodiment is also the application of the present invention to a bar code reader, the configuration of which is the same as illustrated in FIG. 3. Thus, the description of the configuration of the bar code reader is omitted for simplicity of description.

First, the detailed configuration of the ECU 10 of the second embodiment will be described hereinbelow.

Figure 8:
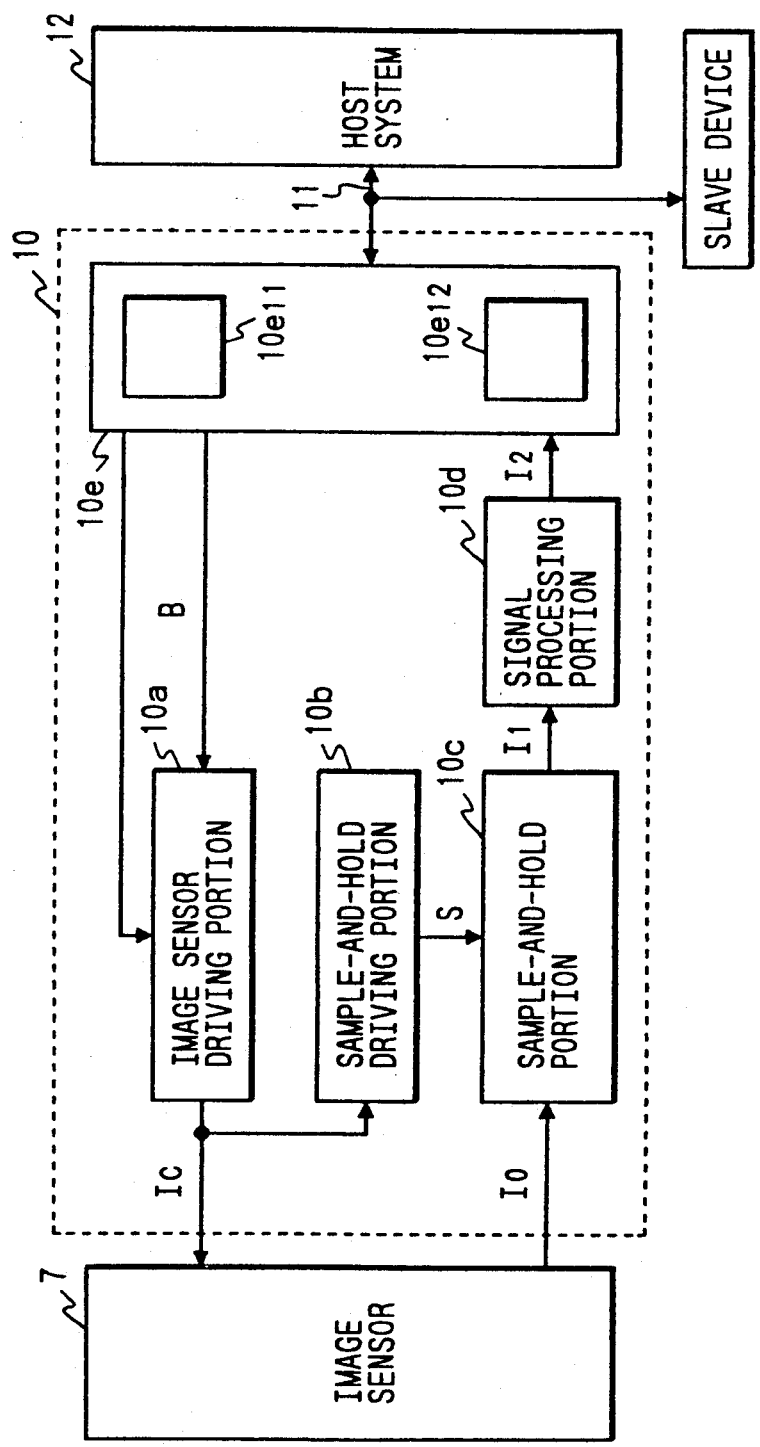
FIG. 8 is a schematic block diagram for illustrating the construction of an ECU of another embodiment of the present invention.

FIG. 8 is a schematic block diagram for illustrating the construction of the ECU 10. As shown in FIG. 8, a CPU 10e comprises an interrupt processing portion $10e_{11}$ and a decode processing portion $10e_{12}$. When a binary information signal $I_2$ is input from a signal processing portion 10d to the decode processing portion $10e_{12}$, a decode processing is performed on the input signal. On the other hand, the interrupt processing portion $10e_{11}$ performs an interrupt processing in accordance with a pre-set program in response to a communication interrupt from a host system 12 thereto. Further, the CPU 10e generates and outputs fundamental clocks B to an image sensor driving portion 10a.

The image sensor driving portion 10a receives the fundamental clocks B generated from the clock generating portion $10e_7$ and generates driving clocks $I_c$ to be used for driving an image sensor 7. Further, the image sensor driving portion 10a has functions of stopping and starting the generation of the driving clocks $I_c$ in response to an interrupt processing by the CPU 10e. The rest of the ECU 10 of the second embodiment is the same as the corresponding parts of the ECU of FIG. 3.

Next, an operation of the second embodiment having the above described configuration will be described hereinbelow.

First, will be described hereinafter an operation of the bar code reader 1 in case where no communication interrupts from the host system 12 occur.

When an operator presses a switch 9 of the reader 1 of FIGS. 3 and 8, irradiation light is irradiated from an illumination light source 2. The irradiation light is incident on a bar code 4 printed on a label 3 and is then reflected at the surface of of the bar code 4. The course of the irradiation light reflected at the surface of the bar code 4 is changed by a plane reflecting mirror 5. Subsequently, the irradiation light is converged by a converging lens 6. Consequently, an image of the bar code 4 is formed on the image sensor 7.

The irradiation light input to the image sensor 7 is converted therein into an information signal $I_0$ as a result of a photoelectric conversion. Namely, the image sensor 7 outputs the information signal $I_0$ in response to the driving signal $I_c$ generated by the image sensor driving portion 10a.

The information signal $I_0$ output from the image sensor 7 is input to a sample-and-hold portion 10c which performs a sample-and-hold operation and then outputs a sampling signal $I_1$ to a signal processing portion 10d. After the amplification and binarization of the sampling signal $I_1$, the signal processing portion 10d outputs the binary information signal $I_2$.

Further, when the binary information signal $I_2$ is input to the CPU 10e, the decode processing portion $10e_2$ performs a bar-code/character-code conversion on the input signal $I_2$ and outputs a character code signal representing the result of the conversion to the host system 12 through a cable 11. Thus, the host system 12 receives the character code signal and then reads code information represented by the bar code 4.

Next, an operation of the bar code reader 1 in case where a communication interrupt from the host system 12 thereto occurs will be described hereinafter with reference to FIG. 9. Incidentally, in such a case, the interrupt processing portion $10e_1$ of the CPU $10e$ mainly responds to the communication interrupt. Thus, an operation of the interrupt processing portion will be described hereinbelow.

Figure 9:
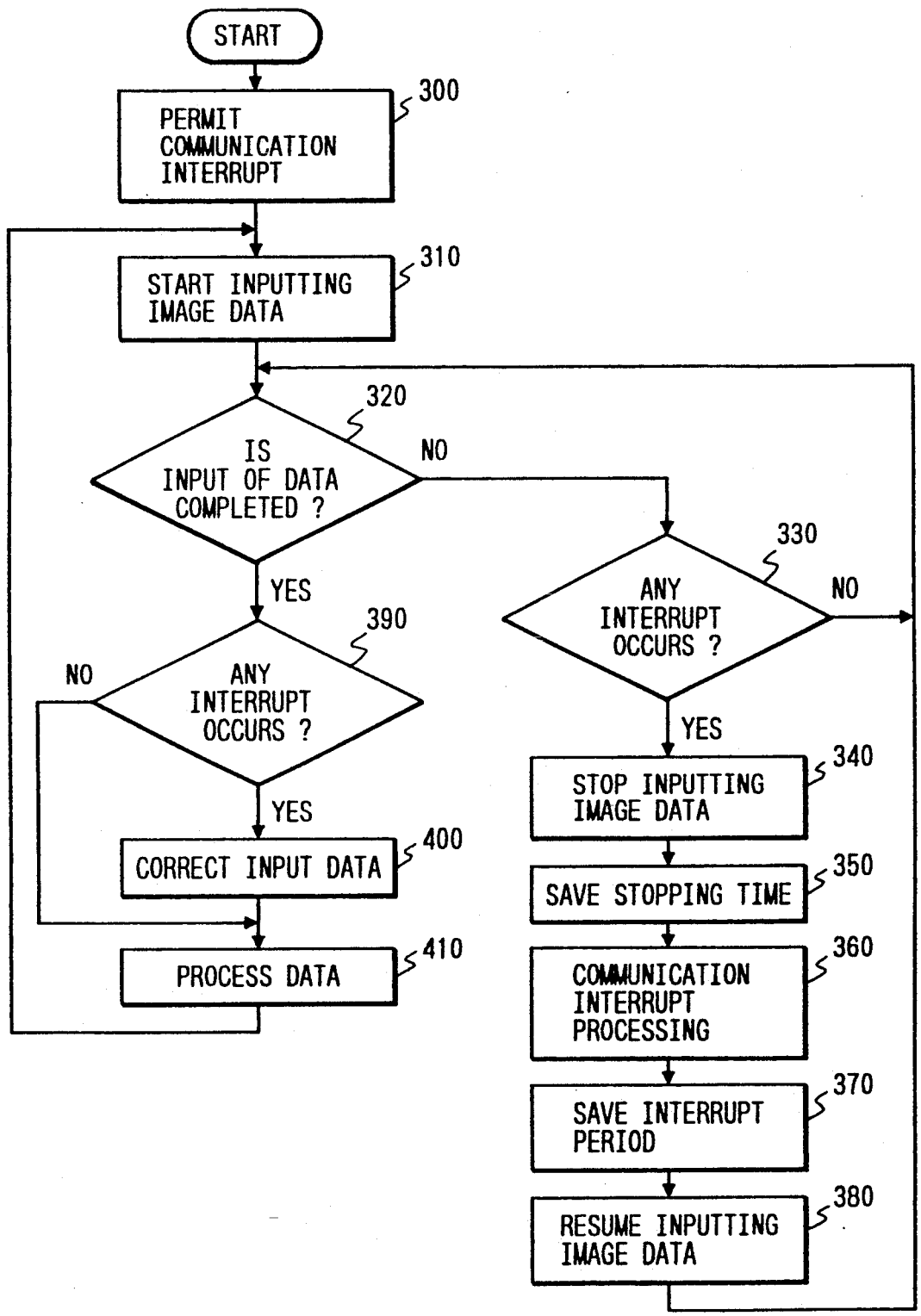
FIG. 9 is a flowchart for illustrating an operation of an interrupt processing portion of a CPU of the ECU of FIG. 8.

FIG. 9 is a flowchart a program for performing an operation of the CPU $10e$. As shown in FIG. 9, in step 300, an initial setting of the bar code reader of FIG. 3 is effected such that a communication interrupt is permitted by the ALU $10e_4$ of FIG. 8. Subsequently, the program advances to step 310.

In step 310, the ALU $10e_4$ causes the image sensor driving portion $10a$ to start generating fundamental clocks B for making the image sensor 7 output the stored information signal $I_0$ indicating the information represented by the bar code 4. Thereby, the information signal $I_0$ is output from the image sensor 7. Thereafter, the binary information signal $I_2$ obtained by the sample-and-hold portion $10c$ and the signal processing portion $10d$ are input to the decode processing portion $10e_{12}$. Then, the program advances to step 320.

In step 320, it is determined whether or not the inputting of the binary information signal $I_2$ obtained by performing an electric processing on the information signal $I_0$ stored in the image sensor 7 is completed. If it is judged that the inputting of the binary information signal is completed, the program goes forward to step 390. If it is judged that the inputting of the signal $I_2$ is not completed, the program enters step 330. Incidentally, this determination is made in step 320 on the basis of whether or not an elapsed time having elapsed since the beginning of the inputting of the signal $I_2$ exceeds a predetermined reference time. Namely, the reference time is preliminarily set according to the storage capacity of the image sensor 7. Further, when the elapsed time exceeds the reference time, the inputting of the data represented by the binary information signal $I_2$ is treated as completed.

In step 330, it is further determined whether or not a communication interrupt from the host system 12 occurs. If there occurs such a communication interrupt, the program advances to step 340. Otherwise, the program returns to step 320. Incidentally, step 330 corresponds to the judgement means.

If there occurs a communication interrupt occurs from the host system 12 during the binary information signal $I_2$ is input to the portion $10e_2$, an interrupt program or process composed of steps 340 to 380 (to be described later) is performed according to the results of the judgement of steps 320 and 330. Incidentally, steps 340 to 380 correspond to the first control means.

In step 340, a stop signal to be used for causing the image sensor driving portion $10a$ to stop the generation of the driving clocks $I_c$ is output for the purpose of stopping the inputting of the binary information signal $I_2$ once. Consequently, the driving clock $I_c$ is not generated by the image sensor driving portion $10a$. Further, the image sensor 7 does not output but stores the information signal $I_0$. Incidentally, the image sensor 7 maintains the signal level of the signal output from the image sensor 7 and keeps the output therefrom when the generation of the driving clock $I_0$ is stopped.

Subsequently, in step 350, the time (hereunder sometimes referred to as the communication interrupt starting time), at which the stop signal to be used for causing the image sensor driving portion $10a$ to stop the generation of the driving clocks $I_0$ is output, is stored in a memory (not shown). The reason of storing data indicating the communication interrupt starting time and communication interrupt finishing time (to be described later) in the memory is to use such data for correcting image data in step 400 to be described later. After the communication interrupt starting time is stored in the memory, the program advances to step 360.

In step 360, a processing indicated by a control command sent at the communication interrupt from the host system 12 is performed. For example, in case where the host system 12 receives an operation changing command, which directs that the number of digits of the bar code to be read is changed from 15 to 10, from a keyboard 14, a control command corresponding to the operation changing command is output from the host system 12 as a communication interrupt. The CPU $10e$ of the bar code reader 1 changes the number of the digits from 15 to 10 in step 360. Incidentally, this step 360 corresponds to the interrupt processing means.

Upon completion of the processing of step 360, the program advances to step 370 whereupon the time, at which the processing is finished, is stored in the memory in step 370. Then, the program goes forward to step 380.

In step 380, an operating signal, which causes the image sensor driving portion $10a$ to resume the generation of the driving clock $I_o$ once stopped in step 340, is output with intention of making the image sensor 7 resume outputting the information signal $I_o$. Thereby, the image sensor driving portion $10a$ generates the driving clock $I_o$ and the image sensor 7 outputs the information signal $I_0$ stored therein to the sample-and-hold portion $10c$.

When the execution of the interrupt processing of steps 340–380 is completed, the program returns to step 320 whereupon it is determined again whether or not the inputting of the binary information signal $I_2$ is finished. Further, the determination of steps 320 and 330 is repeated until the inputting of the binary information signal $I_2$ is completed, in case where there is no communication interrupt from the host system 12 by the time at which the input of the binary information signal $I_2$ is finished.

Upon completion of the inputting of the binary information signal $I_2$, the program advances to step 390 whereupon it is determined whether there occurs a communication interrupt form the host system 12. If it is determined in step 390 that there occurs no communication interrupt from the host system 12, the program advances to step 410. Conversely, if it is determined in step 390 that there occurs a communication interrupt from the host system 12, the program advances to step 400.

In step 400, a correction of the input image data (namely, the binary information signal $I_2$) is performed. This correction is performed by using the communication interrupt starting time and the communication interrupt finishing time, which are stored in steps 350 and 370. Further, image data input in a communication interrupt period between the the communication interrupt starting time and the communication interrupt finishing time are removed from all of the input image data. Incidentally, step 400 corresponds to the second code control means.

Namely, the CPU 10e stores the communication interrupt starting time and the communication interrupt finishing time measured or represented by setting the time, at which the information reading device (namely, the bar code reader) is activated, as 0 second. Then, by removing image data corresponding to the communication interrupt period from all of the input image data. Thereby, unnecessary image data can be removed. Upon completion of the correction, the program advances to step 410.

In step 410, a decode processing is performed on the corrected binary information signal. Further, when the decode processing is completed, a character-code signal, on which the decode processing has been performed, is output to the cable 11, and the host system 12 reads code information represented by the bar code 4.

Incidentally, FIG. 6 shows how the voltage level or waveform of each of the clock and electric signals of the second embodiment varies with time.

Next, modifications of the second embodiment of the present invention will be described hereinbelow.

In case of the second embodiment, in the interrupt processing, image data input thereto is corrected by subtracting data input in the communication interrupt period therefrom. However, the second embodiment may be modified such that when a communication interrupt is detected in step 330, a stop signal for stopping the generation of the driving clock $I_o$ is output to the image sensor driving portion 10a and the inputting of the binary information signal $I_2$ from the signal processing portion 10d is inhibited.

This modification is realized by performing the following method. First, a counter (corresponding to a storage buffer) is provided in the CPU 10e. The contents of this counter are incremented simultaneously with an inputting of the binary information signal $I_2$. The input signal $I_2$ is stored at an address corresponding to a count value. Here, in case where a communication interrupt from the host system is detected, the operation of the counter is temporarily stopped and the inputting of the signal $I_2$ is inhibited. Further, upon completion of the communication interrupt from the host system, the incrementing of the contents of the counter is resumed by again starting a reading of information recorded at a position on the bar code next to the position thereon corresponding to the time, at which the operation of the counter is stopped, and the inputting of the signal $I_2$ is permitted. Such a modification has advantages in that there is no necessity of correcting the image data and that the control logic can be further simplified.

Incidentally, the second embodiment and the modifications thereof are the application of the present invention to a bar code reader. However, as above stated, the present invention can be applied to, for instance, a magnetic card reader as long as the magnetic card reader is an information reading device employed as a slave device of a system in which a large number of slave devices are connected to a master unit through common signal lines.

While preferred embodiments of the present invention have been described above, it is to be understood that the present invention is not limited thereto and that other modifications will be apparent to those skilled in the art without departing from the spirit of the invention. The scope of the present invention, therefore, is to be determined solely by the appended claims.

What is claimed is:

1. An information reading device for use in a system in which a plurality of slave devices are connected to a master unit through a common signal line, the information reading device being employed as the slave device, the information reading device comprising:

irradiation means for irradiating electromagnetic waves on a recording medium, on which a plurality of codes are described;

signal converting means for obtaining information signals representing the codes from electromagnetic waves reflected from the recording medium and storing the information signal;

driving means for outputting a driving signal to the signal converting means and causing the signal converting means to serially output the information signals stored therein;

code information output means for storing the information signals output from the signal converting means to form code information, converting the code information and outputting a signal representing a result of the conversion of the code information to the master unit;

judgement means for determining whether or not an interrupt signal is input from the master unit to the information reading device;

interrupt processing means for performing an interrupt processing in response to the interrupt signal if the judgement means determines that the interrupt signal is input from the host system to the information reading device;

driving signal control means for making the driving means stop outputting the driving signal if the judgement means determines that the interrupt signal is input from the master unit to the information reading device, and for making the driving means resume outputting the driving signal when the interrupt processing means finishes the interrupt processing; and code control means for making the code information outputting means convert the code information by removing data represented by the signal output from the signal converting means when the interrupt processing means performs the interrupt processing.

2. The information reading device according to claim 1, wherein the code information outputting means comprises:

code information forming means for receiving and storing the information signal output from the signal converting means independently of an operation of the interrupt processing means and forming code information; and code converting means for converting the code information stored in the code information forming means and outputting a result of the conversion of the code information to the master unit, wherein the code control means removes first information, which is represented by an information signal input to the code information forming means during the interrupting processing is performed, from the code information, which is input from the code information forming means, and makes the converting means convert a remaining part of the code information obtained as a result of the removal of the first information and output information obtained as a result of the conversion of the remaining part of the code information to the master unit.

3. The information reading device according to claim 1, wherein the code information outputting means comprises:
  code information forming means for receiving and storing the information signal output from the signal converting means independently of an operation of the interrupt processing means and forming code information; and
  code converting means for converting the code information stored in the code information forming means and outputting a result of the conversion of the code information to the master unit, wherein
  the code control means makes the code information forming means remove first information, which is represented by an information signal input to the code information forming means during the interrupting processing is performed, from the code information, which is input from the code information forming means, and store a remaining part of the code information obtained as a result of the removal of the first information and form the code information.

4. An information reading device for use in a system in which a plurality of slave devices are connected to a master unit through a common signal line, the information reading device being employed as the slave device, the information reading device comprising:
  irradiation means for irradiating electromagnetic waves on a recording medium, on which a plurality of codes are described;
  signal converting means for obtaining information signals representing the codes from electromagnetic waves reflected from the recording medium and storing the information signal;
  driving means for outputting a driving signal to the signal converting means and causing the signal converting means to serially output the information signals stored therein;
  judgement means for determining whether or not an interrupt signal is input from the master unit to the information reading device;
  interrupt processing means for performing an interrupt processing in response to the interrupt signal if the judgement means determines that the interrupt signal is input from the host system to the information reading device;
  driving signal control means for making the driving means stop outputting the driving signal if the judgement means determines that the interrupt signal is input from the master unit to the information reading device, and for making the driving means resume outputting the driving signal when the interrupt processing means finishes the interrupt processing;
  storage means for receiving the information output from the signal converting means, storing the received information signal to form code information and inhibiting the receiving of the information signal from time, at which the interrupt processing means starts performing the interrupt processing, till time, at which the interrupt processing means finishes the interrupt processing; and
  code converting means for converting the code information stored in the storage means and outputting a result of the conversion of the code information to the master unit.

5. An information reading device for use in a system in which a plurality of slave devices are connected to a master unit through a common signal line, the information reading device being employed as the slave device, the information reading device comprising:
  signal converting means for irradiating electromagnetic waves on a recording medium, on which a plurality of codes are described, and for obtaining information signals representing the codes and for storing the information signal;
  driving means for outputting a driving signal to the signal converting means and causing the signal converting means to serially output the information signals stored therein;
  code converting means for storing the information signals output from the signal converting means to form code information, converting the code information and outputting a signal representing a result of the conversion of the code information to the master unit;
  judgement means for determining whether or not an interrupt signal is input from the master unit to the information reading device;
  interrupt processing means for performing an interrupt processing in response to the interrupt signal if the judgement means determines that the interrupt signal is input from the host system to the information reading device;
  first control means for making the driving means stop outputting the driving signal if the judgement means determines that the interrupt signal is input from the master unit to the information reading device, and for making the driving means resume outputting the driving signal when the interrupt processing means finishes the interrupt processing; and
  second control means for making the code converting means convert the code information by removing data represented by the signal output from the signal converting means when the interrupt processing means performs the interrupt processing.

* * * * *